United States Patent [19]  
Percs et al.

[11] 3,849,252  
[45] Nov. 19, 1974

[54] ENZYME COMPOSITION AND PROCESS FOR THE MANUFACTURE THEREOF

[76] Inventors: Edmund E. Percs, Basel; Kurt F. Stocker, Basel-Land, both of Switzerland; Birger Blombäck; Margareta Blombäck, both of Stockholm, Sweden; Birgit Hessel, Bandhagen, Sweden

[73] Assignee: Pentapharm A.G., Basle, Switzerland

[22] Filed: Jan. 14, 1972

[21] Appl. No.: 217,994

[30] Foreign Application Priority Data  
Jan. 18, 1971    Switzerland............................ 733/71

[52] U.S. Cl.................... 195/62, 195/66 B, 424/94, 195/103.5 R
[51] Int. Cl. ........................ C07g 7/02, A61k 19/00
[58] Field of Search ............................. 195/62, 66 B

[56] References Cited  
UNITED STATES PATENTS  
3,657,416    4/1972    Reid............................ 195/66 B X  
3,711,376    1/1973    Hatton................................ 195/62

OTHER PUBLICATIONS  
Funk et al., British Journal of Haematology, 1971, Vol. 21, pages 43–52.

Primary Examiner—Lionel M. Shapiro  
Attorney, Agent, or Firm—Pennie & Edmonds

[57] ABSTRACT

An enzyme composition which has a thrombin-like endopeptidase activity and which is useful in human and veterinary medicine in vivo at low doses as a hemostatic agent or at higher doses as a blood anticoagulant. The enzyme composition is also useful as a reagent for in vitro investigations of the blood of humans or other mammals. The enzyme composition is obtained from the venom of Bothrops atrox or any other snake the venom of which is immunologically cross-reactive with Bothrops atrox venom. The process for preparing the enzyme composition comprises treating an aqueous solution of the snake venom at a pH of about 4 to 6 with phenol or a phenol derivative in order to precipitate an insoluble complex containing the active venom fraction and decomposing the complex in order to release the thrombin-like enzyme composition.

13 Claims, No Drawings

ENZYME COMPOSITION AND PROCESS FOR THE MANUFACTURE THEREOF

BACKGROUND OF THE INVENTION

The invention relates to an enzyme composition which has a thrombin-like endopeptidase activity and which is useful in human and veterinary medicine either as a hemostatic agent at low doses or as a blood anticoagulant at higher doses. The invention also relates to a process for preparing said enzyme composition from snake venom. The invention further relates to a pharmaceutical preparation which comprises the said enzyme composition as the active principle and which is suitable for parenteral administration. The invention still further relates to a reagent which comprises said enzyme composition and which is useful for investigating in vitro blood of mammals, in particular human blood.

According to British Pat. No. 1,094,301 an enzyme having a thrombin-like and anticoagulant activity can be obtained from the venom of Ancistrodon rhodostoma. This enzyme has the following properties: it is proteinaceous and substantially colourless when pure, it is adsorbable on weakly basic anion exchange materials such as diethylaminomethyl cellulose and triethylaminoethyl cellulose, it is soluble in physiological saline, it has an electrophoretic mobility of $3.9 \times 10^{-5}$ volts/cm/sec. in 0.1 M phosphate buffer $p_H$ 7.0, it has a molecular weight no greater than 40,000 in monomeric form, as determined in the ultracentrifuge, it has a sedimentation co-efficient $S_{20}W = 3.4$ svedbergs at a concentration of 4.86 mg/ml., it has a partial specific volume of 0.7 approximately at a concentration of 4.86 mg/ml., its biological activity is thrombin-like and anticoagulant in vivo, and it is not significantly inhibited by $1 \times 10^{-3}$ molar diisopropylfluorophosphate within 5 minutes.

We have found that it is possible to obtain from the venom of the Bothrops atrox or any other snake the venom of which is immunologically cross-reactive with Bothrops atrox venom an enzyme composition which, on the one hand, at adequately low doses acts as a hemostatic agent and, on the other hand, at higher doses exerts an indirect coagulation-inhibiting effect on the blood of humans and other mammals by substantially removing the fibrinogen from the blood circulation without significantly influencing hemostasis, and which can therefore be used as a blood anticoagulant. This enzyme composition, as compared to the enzyme according to British Patent No. 1,094,301, presents several advantages which are described hereinafter.

BRIEF SUMMARY OF INVENTION

The enzyme composition of this invention which exerts, at lower doses, a hemostatic activity and, at higher doses, a blood anticoagulant activity in humans and other mammals, is characterized by the following properties:

a. it has a thrombin-like endopeptidase activity,
b. it comprises a peptide component and a carbohydrate component, the peptide component including one or more polypeptides having a molecular weight between about 18,000 and 55,000 as determined by the equilibrium ultracentrifugation method,
c. it has a carbohydrate (neutral sugar) content of of about 2 to 10 percent by weight, based on the protein content,
d. it is scarcely soluble in distilled water but readily soluble in physiological sodium chloride solution,
e. it forms complexes with phenol and phenol derivatives, which complexes are scarcely soluble or insoluble in water,
it causes coagulation of fibrinogen by selective elimination of fibrinopeptides A from fibrin without releasing fibrinopeptides B.
g. it has a thrombin-like activity corresponding to about 30 to 450 NIH-thrombin units per mg. of protein content,
h. it splits tosylarginine methyl ester and gelatin but not lysin methyl ester, phenylalanine ethyl ester, N-acetylmethionine, N-acetyltyrosine, leucylglycine and casein,
i. it is not inhibited by heparin, heparinoids, hirudin, antithrombins and the polyvalent peptidase inhibitor of KUNITZ, (cf. J. Gen. Physiol. 19, 991–1007 [1936]),
k. it is inhibited at an enzyme concentration of about 5 mg. per ml. to the extent of about 95 percent with respect to its coagulation and esterase activity by $2.5 \times 10^{-3}$ molar diisopropyl fluorophosphate at a pH of 8 within 2 hours,
l. it is competitively inhibited by tosylarginine methyl ester and completely inhibited by the antibody contained in antibothrops serum,
m. it is not fixed and, therefore, not inactivated by fibrin,
n. it has a substantially longer biological halflife time than heparin,
o. it causes the formation of a fibrin derivative which interacts with excess fibrinogen to form a nonpolymerizable fibrin-fibrinogen complex,
p. it acts on fibrogen with formation of a fibrin which has physico-chemical properties different from those of fibrin produced by thrombin insofar as it is rapidly hydrolyzed by fibrinolytic enzymes, e.g. plasmin, even in the presence of activated factor XIII and of calcium ions and is soluble in 5-molar aqueous urea, and
q. it causes in vivo a defibrinogenation and a secondary fibrinolysis without hemorrhagic and tromboembolic side effects.

According to the invention the enzyme composition is obtained by a process which comprises:

1. preparing an isotonic aqueous solution of venom of Bothrops atrox or any other snake the venom of which is immunologically cross-reactive with Bothrops atrox venom, adjusted to a pH of about 4.5 to 7,
2. either
a. subjecting the said isotonic solution to a fractional salt precipitation in order to first eliminate ballast substances and then to precipitate a fraction containing the enzyme material, dissolving the said fraction in distilled water, adjusting the solution to a pH of about 3–4, heating the solution for a few minutes to about 2 hours at temperatures of about 30°–50°C., separating precipitated proteins and adjusting the pH of the residual solution to about 4 to 6, or b. adjusting the said isotonic solution to a pH of 3 to 4 and heating the same for a few minutes to about 2 hours at temperatures of about 30°–50°C., separating precipitated proteins, adjusting the residual solution to a $p_H$ of about 4.5 to 7, subjecting the same to a fractional salt precipitation in order to first eliminate ballast substances and then to precipitate a fraction containing the active enzyme material, dissolving the said fraction in distilled water and adjusting the solution to a $p_H$ of about 4 to 6, and 3. adding phenol or a phenol derivative to the solution obtained according to 2 (a) or (b) in order to precipitate an insoluble complex containing the enzyme material, and either
   a. decomposing the complex by treatment with dilute acetic acid in a polar organic solvent and isolating the released, undissolved enzyme material, or
   b. treating the complex in an aqueous medium with a base at a pH of about 7.5 to 8.5 and isolating the released enzyme material by ultrafiltration, dialysis or gel filtration, and further purifying the thus obtained enzyme material.

DETAILED DESCRIPTION OF INVENTION

The venom used as starting material for preparing the enzyme composition of the invention is preferably that of the snake Bothrops atrox. Other names and identifications for this same snake are found in the literature, e.g. Coluber atrox LINNAEUS (Sys. Nat. Ed. 10, 1:222, 1758), Bothrops atrox LINNAEUS (Duméril, Bibron et Duméril, Erpet. gen., 7:1507, 1854), Lachesis lanceolatus BOULENGER (Cat. Snak. Brit. Mus., 3:535, 1896), Lachesis atrox LINNAEUS (Boulenger, Cat. Snak. Brit. Mus., 3:537, 1896), Bothrops atrox atrox LINNAEUS (J. A. Peters, Bull. Mus. comp. Zool., Cambridge, Mass., 122:509, 1960), and Bothrops moojeni HOGE (A. R. Hoge, Mem. Inst. Butantan, 32:126, 1965). The venom of other Bothrops species, e.g. of Bothrops jararaca, can also be used. As a rule, the venom of any other snake which is immunologically crossreactive with Bothrops atrox venom can be used. A definition and explanation of the term "immunological cross-reaction" can be found, e.g. in "Einführung in die Immunchemie und Immunologie" by E.A. KABAT, Springer Verlag 1971, pages 1 ff.

A more specific manner of carrying out the process for preparing the enzyme composition of the invention is described hereinafter.

Freeze-dried snake venom, e.g. Bothrops atrox venom, is dissolved in physiologial sodium chloride solution at a $p_H$ of about 4.5 to 7. Undissolved material is removed from the solution by centrifugation or filtration. The clear venom solution is adjusted to a weakly acid pH, e.g. of about 3 to 4, by the addition of a mineral acid, e.g. hydrochloric acid or sulphuric acid, or an organic acid, e.g. acetic acid, and is then heated, while stirring, so that ballast proteins are precipitated without any loss of active principle. The extent of this precipitation depends on the heating time and on the temperature as well as on the pH of the solution. At a pH of 3 a few minutes are sufficient, e.g. 10 minutes at 30°C. At a pH of 3.5 the heating time is conveniently extended to 1 hour at 30°C. or 30 minutes at 40°C. At a pH of 4 the heating time can be extended to about 2 hours and the temperature raised to about 50°C.

Precipitated proteins are separated by centrifugation. The filtrate is adjusted to a pH of about 4.5 to 7, preferably about 6.5, and subjected to a fractional salt precipitation in order to remove first a fraction of ballast substances and then to precipitate the fraction of active principle. This fractional precipitation can be carried out with ammonium, alkali metal or alkaline earth metal salts of mineral acids, e.g. sodium chloride or sulphate, magnesium chloride or sulphate and ammonium chloride or sulphate. If ammonium sulphate is used at a pH of 6.5, the ballast fraction is precipitated at 40 percent saturation and the active fraction at 55 percent saturation at 20°C. If other salts, pH values and precipitation temperatures are used, different saturation degrees are required.

The active fraction is separated from the mother liquor by centrifugation and dissolved in distilled water. The solution is adjusted to a pH of about 4 to 6, preferably about 5.0. The active principle is precipitated as a complex by the addition of about 7 percent by weight of phenol or a corresponding amount of a phenol derivative. Suitable phenol derivatives are phenolcarboxylic acids, e.g. salicyclic acid, alkyl-phenols, e.g. o-, m- or p-cresol, halogenated phenols, e.g. o-, m- or p-chlorophenol, halogenated or alkylated phenolcarboxylic acids, e.g. cresol acids and chlorophenol acids, or salts of phenolcarboxylic acids or their derivatives, e.g. sodium salicylate, and the sodium salts of cresolcarboxylic acids. Phenol-formaldehyde-resins having free phenol groups, e.g. Amberlite XE 97, can also be used. The required amount of precipitant corresponds, as a rule, to the limit of solubility of the corresponding derivative or in the case of the acids to the limit of solubility of the corresponding free acid. The insoluble complex of the active principle formed in this manner is separated by centrifugation and can then be decomposed in one of the manners described below in (a) and (b).

(a) The separated complex is washed several times with a solution of 0.1–0.5 percent acetic acid in a polar solvent in order to decompose the complex and to dissolve the phenol or phenol derivative, whereas the active principle remains as an insoluble residue. Suitable polar solvents include e.g. alkanols having a chain length of e.g. $C_1$ to $C_4$, dialkyl ketones having the formula $R^1 - CO - R^2$ wherein $R^1$ and $R^2$ are alkyl groups having a chain length of e.g. $C_1$ to $C_4$, as well as dialkyl ethers having the formula $R^1 - O - R^2$ wherein $R^1$ and $R^2$ are alkyl groups having a chain length of e.g. $C_2$ to $C_3$.

(b) The complex consisting of the active principle and phenol or the phenol derivative is dissolved in water at a pH of about 7.5 to 8.5, preferably 8. The pH value can be adjusted by means of an alkali metal hydroxide, alkali metal acetate, alkali metal citrate, alkali metal carbonate or bicarbonate, di- or trialkali metal phosphate or another basic buffer or by means of ammonium hydroxide or ammonia. The solution is filtered under $N_2$-pressure through an ultrafilter whose mesh size is such that the active principle, viz, the enzyme composition, is retained on the filter, whereas the phenol or phenol derivative passes through the filter in dissolved form. Suitable filters are "Diaflo"-filters of the types UM–05, UM–2, UM–10 and PM–10 ("Diaflo[-]filters are ultrafilters, e.g. membranes from synthetic polymers, sold by AMICON, Oosterhout [N.B.], Holland). The active principle retained on the filter is washed with several portions of distilled water or a solution of a suitable preserving agent in order to remove residual phenol or phenol derivative and simultaneously concentrated.

The active enzyme composition from which the phenol or phenol derivative has been removed has an activity of about 10–15 NIH-thrombin units per 1 mg. of dry substance (purity degree I); however, it still produces three precipitin lines in the immunopherogram and four protein zones in the acrylamide pherogram and has a yellow colour. Moreover, the enzyme composition of purity degree I also shows thromboplastic activity.

For further purification, the enzyme composition of purity degree I can be dissolved in tris(hydroxymethyl-)-aminomethane-phosphate buffer ($p_H$ 6.0/0.02 molar) to form a 5 percent solution and subjected to chromatography on a column of DEAE-"Sephadex A–50" (DEAE = diethylaminoethyl; "Sephadex" is a trademark for polydextran products supplied by PHARMACIA, Uppsala, Sweden) which has previously been converted to the $PO_4$-form and equilibrated with TRIS-phosphate buffer (pH of 6.0; 0.02 molar). The chromatography is carried out by pouring the solution of the enzyme composition onto the column, removing ballast substances by washing the column with 4 times its volume of TRIS-phosphate buffer (pH of 6.0; 0.02 molar) [TRIS = tris(hydroxymethyl)-aminomethane] and then dissolving the enzyme composition by elution with 2 times the column volume of TRIS-phosphate buffer (pH 6.0; 0.02 molar). The salts are removed from the active eluate by ultrafiltration. Freeze-drying of the filtrate yields an enzyme composition of purity degree II corresponding to an activity of 100–200 NIH-thrombin units per mg. of protein content. The immunopherogram then shows a single precipitin line, whereas two zones are observed in the acrylamine pherogram.

The enzyme composition can be obtained in crystalline form by allowing the salt-free concentrate resulting from the ultrafiltration to stand for 48 hours at +2°C., collecting the separated crystals by centrifugation, and cooling, and washing the crystals with ice-cooled distilled water. There are thus obtained, a small yield, rectangular platelets which form amorphous particles, rapidly when drying in vacuo, and gradually when drying in the air. If such crystal suspensions are dried, enzyme compositions having an activity of more than about 200 NIH-thrombin units per mg. of protein content (purity degree III) are obtained.

The enzyme composition of purity degree II appears to be homogeneous in the paper electropherogram, membrane electropherogram, gel chromatogram, ion exchange chromatogram and immunodiffusogram according to OUCHTER-LOHNY. However, a pharmacologically inactive polypeptide fraction can be separated from the active enzyme fraction by electrophoresis in polyacrylamide gel. The inactive component can be separated from the active enzyme fraction by subjecting the enzyme composition of purity degree II to a gel chromatography using a mixture of an aliphatic carboxylic acid with water or a mixture of an aqueous buffer solution with a water-miscible organic solvent as a flowing agent. Either hydrophobic or hydrophilic gels may be used for this gel chromatography. Examples of hydrophilic gels include polydextran gels such as "Sephadex" (sold by PHARMACIA, Uppsala, Sweden), polyacrylamide gels such as "Bio-Gel" (prepared by Bio-Rad Laboratories, Richmond, California), and agarose or agar gels such as "Sepharose" (PHARMACIA, Sweden). The gel chromatography is conveniently carried out at an invariable hydrogen ion concentration, e.g. within a pH range of about 2 to 9, preferably at a pH of 2 to 6. Suitable carboxylic acids are, e.g., water-miscible aliphatic monocarboxylic acids having a straight or branched chain and containing 1 to 4 carbon atoms. Conventional buffers which are soluble in mixtures of water and solvents can be used, e.g. formates, acetates, phosphates, citrates and carbonates of inorganic bases, such as alkali metals or ammonium, or organic bases, such as pyridine or tris(hydroxymethyl)-amino-methane. Buffers which do not absorb UV radiation and which are volatile in vacuo, such as ammonium formate or ammonium acetate, are conveniently used so that the course of the chromatography can be followed by densitometric evaluation of the eluates in the UV range and that the eluates can be concentrated by freeze-drying. The aliphatic carboxylic acids can be used at concentrations of about 5 to 95 percent by volume in water. When hydrophilic gels are used for the chromatography, the carboxylic acid concentration is conveniently comprised between about 5 and 50 percent by volume. When aqueous buffers are used, a water-miscible organic solvent is added at a concentration between about 5 to 95 percent by volume. If hydrophilic gels are used, the solvent concentration is conveniently comprised between about 10 to 50 percent by volume. Examples of suitable water-miscible solvents include alkanols having a straight or branched chain and containing 1 to 5 carbon atoms, ketones such as acetone, diethyl-ketone or methyl-ethyl-ketone, alkylamines such as mono-, di- or tri-methyl-, ethyl- or propylamine, urethanes, such as ethylurethanes. Since the eluates are preferably concentrated by freeze-drying, it is advisable to use solvents which are volatile in vacuo and which do not substantially lower the freezing point of the solution. Examples of suitable solvents are tert.-butanol and cyclohexanol.

The enzyme compositions obtained by the gel chromatography described above have a biological activity varying between about 200 and 400 NIH-thrombin units per mg. of protein content (purity degree III). A substantial portion of the inactive fraction is removed from the enzyme composition by the gel chromatography.

The terms "purity degree II" and "purity degree III" as used in this specification have the following meaning:

Purity degree II = about 100 to 200 NIH-thrombin units per mg. of protein content;
Purity degree III = about 200 to 400 NIH-thrombin units per mg. of protein content.

The values of the amino acid analysis of the enzyme composition vary, depending on the purity thereof, between the approximate limits given hereinafter. The amino acid analysis was carried out by subjecting the enzyme composition to a hydrolysis by means of constant boiling hydrochloric acid at 110°C. for 22 to 72 hours in a nitrogen atmosphere.

| Amino acids | micromoles per mg. of peptide component |
|---|---|
| Aspartic acid | 1 – 1.3 |

-Continued

| Amino acids | micromoles per mg. of peptide component |
|---|---|
| Threonine | 0.35– 0.55 |
| Serine | 0.4– 0.5 |
| Glutamic acid | 0.65– 0.75 |
| Proline | 0.55– 0.9 |
| Glycine | 0.65– 0.9 |
| Alanine | 0.4 – 0.65 |
| Cystine ½ | 0.35– 0.6 |
| Valine | 0.45– 0.6 |
| Methionine | 0.1 – 0.2 |
| Isoleucine | 0.45– 0.75 |
| Leucine | 0.45– 0.65 |
| Tyrosine | 0.3 – 0.5 |
| Phenylalanine | 0.3 – 0.45 |
| Histidine | 0.2 – 0.25 |
| Lysine | 0.45–0.65 |
| Arginine | 0.3 – 0.45 |

By way of example, some values of the amino acid analysis are given for:
A = an enzyme composition of purity degree II
B = an enzyme composition of purity degree III (i.e. an enzyme composition having a substantially reduced content of inactive material)

| Amino acids | micromoles per mg. of peptide content | |
|---|---|---|
| | A | B |
| Aspartic acid | 1.05 – 1.1 | 1.17 – 1.25 |
| Threonine | 0.35 – 0.41 | 0.42 – 0.54 |
| Serine | 0.43 – 0.45 | 0.41 – 0.5 |
| Glutamic acid | 0.67 – 0.7 | 0.66 – 0.71 |
| Proline | 0.58 – 0.76 | 0.79 –0.87 |
| Glycine | 0.67 – 0.76 | 0.76 – 0.9 |
| Alanine | 0.41 – 0.5 | 0.63 – 0.64 |
| Cystine ½ | 0.47 – 0.6 | 0.35 – 0.42 |
| Valine | 0.47 – 0.55 | 0.55 – 0.6 |
| Methionine | 0.17 – 0.2 | 0.13 – 0.17 |
| Isoleucine | 0.45 – 0.55 | 0.65 – 0.72 |
| Leucine | 0.46 – 0.47 | 0.6 – 0.64 |
| Tyrosine | 0.33 – 0.5 | 0.3 – 0.36 |
| Phenylalanine | 0.33 – 0.43 | 0.33 – 0.38 |
| Histidine | 0.2 –0.22 | 0.21 – 0.23 |
| Lysine | 0.5 –0.64 | 0.48 – 0.53 |
| Arginine | 0.3 – 0.4 | 0.32 – 0.36 |

The carbohydrate component of the enzyme composition of this invention is believed to be at least partially bound to a polypeptide as a glycopeptide. The carbohydrate (neutral sugar) determination was carried out by the orcinol method (cf. L.F. Hewitt, Biochem. J. 31, 360 [1937]).

The enzyme composition of purity degree III (i.e. the composition having a reduced content of inactive material) apparently contains a peptide component having a probable molecular weight between about 38,000 and 55,000. The peptide component of the enzyme composition of purity degree II apparently has a molecular weight of about 28,000 to 55,000.

The enzyme composition in its purity degree II form apparently contains a component which activates factor XIII.

In a highly purified state (purity degree III) the enzyme composition has the following amino acid sequence (as determined by the Edman-Degradation-Method described in "Protein Sequence Determination", S.B. Needleman, Springer-Verlag, Berlin-Heidelberg, New York, 1970, p. 211 ff.) starting from the N-terminal chain end: valine → isoleucine → glycine → glycine → aspartic acid → glutamic acid.

The enzyme composition of the invention is free from neurotoxins having adverse effects on the nervous system, bradykinin-forming proteases (bradykinin exerts a blood-tension lowering action), phospholipases (which act hemolytically and cause damages in the kidney), amino acid oxydases and phosphatases.

The enzyme composition of the invention can be used as a reagent and auxiliary agent in coagulation-physiological examinations in vitro, e.g. for the investigation of the fibrinogen-fibrin conversion in the presence of heparin and antithrombins, or for investigations relating to fibrinopeptides, pathological fibrinogen structures, fibrinogen degradation products, factor VIII and factor XIII.

If administered in moderate doses in vivo, the enzyme composition of the invention causes a reduction of the bleeding and the coagulation time in experimental animals as well as in patients having a normal or pathological state of hemostasis. If administered intravenously to healthy humans in moderate doses, the enzyme composition causes the formation of soluble fibrin-fibrinogen complexes in the circulating blood, as shown by the positive cryofibrin and paracoagulation test in the plasma, as well as the N-terminal analyses of plasma fractions derived from patients. Therefore, the enzyme composition of the invention is useful as a hemostatic agent.

If the new enzyme composition is administered at higher doses to dogs, a rapid defibrinogenation as well as a secondary fibrinolysis and the occurrence of fibrinogen degradation products (FDP) in the blood are observed. Defibrinogenation and fibrinolysis take place without any shock symptoms, without thrombocytopenia and without thromboembolic or hemorrhagic complications. Clinical experiments on patients with thromboses of the leg vanae or of the retina vanae have shown that the enzyme composition of the invention is particularly suitable for a defibrinogenating and fibrinolytic therapy.

As far as we know, the new enzyme composition cannot be replaced by any other comparable preparation in its specific application as a reagent. Although the thrombin coagulase which is obtained from a staphylococcic enzyme is also a thrombin-like enzyme which is not inhibited by antithrombins, it splits peptide A as well as peptide B from the fibrinogen molecule, whereas the enzyme composition of the invention releases solely peptide A.

Among the hemostatic products having a thrombin-like activity the enzyme composition of the invention is unique due to its injectability. Thrombin, thrombin-coagulase and thrombin-generating agents such as complete thromboplastins and venom of the Russel viper, when administered parenterally, cause thromboembolic symptoms and thrombocytopenia; they can, therefore, only be administered locally.

If the enzyme composition of the invention is used at higher doses in the defibrinogenating treatment of thromboembolic disorders, it acts as an anticoagulant and simultaneously induces fibrinolysis. Due to the removal and degradation of most of the fibrinogen, the blood loses its coagulability as a result of the defibrinogenation process. Moreover, fibrinogen degradation products produced in the course of the induced fibrinolysis have a coagulation-inhibiting activity. After a few days (e.g. 2 to 3 days) of treatment, the level of fibrinogen degradation products is so low that they do not increase the bleeding tendency. There is no thrombocytopenia in the course of the defibrinogenation and the patients do not show any significantly increased bleeding tendency at a fibrinogen level of 0.01 to 0.05 g. per 100 ml. of plasma. Such patients can also undergo surgical interventions without dangerous bleeding. The relatively weak impairment of hemostasis caused by the enzyme composition of the invention constitutes a great advantage as compared with the anticoagulants of the heparin group and the anticoagulants of the dicoumarol series which inhibit the synthesis of various coagulation factors in the liver and also strongly impair the hemostatic processes. Due to its pronounced anticoagulating effect the new enzyme composition is particularly suitable for preventing thrombus formation during surgical interventions. No resistance has so far been observed with this enzyme composition when administered intravenously to patients. Medication and supervision of the therapy are very simple with the enzyme composition of the invention.

As compared with the anticoagulant obtainable according to British Patent No. 1,094,301 the enzyme composition of the invention presents essential advantages inasmuch as its physiological activity lasts substantially longer. At comparable doses the new enzyme composition exerts a longer lasting defibrinogenating activity. Whereas heparin has to be injected every 4 to 6 hours, a single dose of the new enzyme composition will be active for at least 24 hours. Furthermore it does not induce active immunization (resistance) when administered intravenously. Whereas the anticoagulant described in British Patent No. 1,094,301 must be used as doses of 4 to 6 times 60 units kg. of body weight within 24 hours (1 unit = amount of enzyme which, applied to human fibrinogen, has the same coagulation time as 1 NIH unit of thrombin; NIH = National Institute of Health), a single dose of not more than 14 units of the enzyme composition of the invention per 60 kg. of body weight is sufficient for maintaining during 24 hours a state of defibrinogenation in a human adult.

The activity of the enzyme composition of the invention is measured and indicated on the basis of its thrombin-like action on human fibrinogen. One unit of the enzyme composition of the invention is equivalent to the amount which causes a fibrinogen solution to coagulate within the same time as does one NIH unit of standard thrombin.

In a purified state the enzyme composition of the invention is readily soluble in dilute salt solutions, but scarcely soluble in distilled water. It can be precipitated from aqueous solutions by means of salts or watermiscible organic solvents. It can be reversibly fixed on basic ion exchangers and forms water-insoluble complexes with phenol and its derivatives. Furthermore, it is characterized by a high heat resistance and a pronounced resistance to acids.

As a hemostatic agent the enzyme composition of the invention is conveniently administered in daily doses of about 0.25 to 1.5 NIH units per 60 kg. of body weight. As a blood anticoagulant the enzyme composition is conveniently used in daily doses of about 2 to 100 NIH units, preferably about 7 to 14 NIH units per 60 kg. of body weight.

The present invention also relates to a pharmaceutical preparation containing the enzyme composition of the invention as the active principle. If this preparation is to be used as a blood anticoagulant, it conveniently contains about 10 to 500 micrograms, preferably about 100 micrograms, of the active principle per unit dose. The enzyme composition is conveniently dissolved in an aqueous medium suitable for parenteral administration. For practical purposes vials containing 2 ml. of aqueous solution of the enzyme composition are particularly suitable. This solution conveniently contains about 0.9 percent of NaCl, about 0.3-0.5 percent of phenol and about 0.01-0.2 percent of partially hydrolyzed gelatin (as a stabilizer) and presents a pH of about 5.0 to 8.0, preferably 6.5.

The invention further relates to a reagent which is useful for investigating in vitro the blood of mammals, in particular humans, e.g. for investigating the formation of fibrin or anomalies in the fibrin formation, for rapidly determining the fibrinogen level in the presence of heparin, for rapidly detecting fibrin and fibrin degradation products in plasma, as a substitute for thrombin in blood coagulation tests.

For practical purposes the reagent of the invention is conveniently made up of a preparation consisting of e.g. 10 to 50 micrograms of freeze-dried enzyme composition, 1 mg. of partially hydrolyzed gelatin (as a stabilizer), 2 mg. of methyl p-oxybenzoate, 8.5 mg. of NaCl and glycine ad 34 mg. This unit preparation can be dissolved in 1 ml. of distilled water and is then ready to be used.

EXAMPLE 1

20 g. of Bothrops atrox venom were dissolved in 1000 ml. of 0.9 percent NaCl solution and then centrifuged for 10 minutes at 3000 revolutions per minute. The precipitate was discarded. The centrifugate was adjusted to pH 3.5 by means of dilute acetic acid, heated at 30°C. for 1 hour on a water bath and then again centrifuged. The residue was discarded, the centrifugate was adjusted to pH 6.5 by means of NaOH and its volume completed to 1000 ml. with 0.9 percent NaCl solution. To this solution were added, while stirring, 670 ml. of saturated ammonium sulphate solution. The mixture was allowed to stand at room temperature for 1 hour, and then the resulting precipitate was separated by centrifugation. A further 552 ml. of saturated ammonium sulphate solution were added to the centrifugate, and after 1 hour the mixture was centrifuged. The centrifugate was discarded, the precipitate was dissolved in 100 ml. of distilled water, and the pH of the solution was adjusted to 5.0 by means of dilute acetic acid. 7.7 ml. of 90 percent phenol were added to the solution, while stirring. The mixture was allowed to stand for 15 hours at room temperature. Then, the precipitated enzyme was separated by centrifugation. The centrifugate was discarded. The precipitate was washed twice with 10 ml. of water saturated with phenol, separated by centrifugation and taken up in 50 ml. of ethanol containing 1 percent acetic acid. The mixture was stirred for 1 hour and then filtered on a glass suction filter. The isoalted substance was washed with several portions of 20 ml. of ethanol and dried in vacuo. There were thus obtained 2 to 2.5 g. of enzyme composition of purity degree I having a thrombin-like activity of about 10–12 NIH units per mg. of dry substance. This product was stable when stored.

The crude enzyme was taken up in 40 ml. of TRIS-phosphate buffer (pH of 6.0; 0.02 molar) and stirred for 15 minutes. Undissolved portions were removed from the solution by centrifugation. The clear centrifugate was poured at a rate of 0.8 to 1.0 ml./min. onto a column of 200 ml. of DEAE-Sephadex equilibrated with TRIS-PO$_4$-buffer and then eluted with 800 ml. of the same buffer/solution. The first eluate fraction was discarded. Then, the enzyme was eluted with 400 ml. of TRIS-PO$_4$-buffer (0.04 molar). The active eluate was recovered and concentrated on an ultrafilter UM-10 (AMICON) under pressure and washed until it was free of salts. The salt-free concentrate was dried in vacuo over P$_2$O$_5$ or was freeze-dried. There were thus obtained 200–250 mg. of enzyme composition of purity degree II having an activity of about 100 to 150 NIH thrombin-units per mg. of protein content.

The salt-free concentrate was further concentrated to 5 ml. on the ultrafilter. The solution was filtered through a glass suction filter of porosity G-4 to remove any dust. The clear solution was allowed to stand for at least 24 hours in the refrigerator at +2°C. The enzyme composition separated in the form of rectangular crystals. The latter were separated by centrifugation at 0°–2°C., washed several times with 0.5 ml. portions of distilled water, while cooling with ice, and then dried over P$_2$O$_5$. There were thus obtained 45 mg. of a colourless enzyme product having an activity of about 150 to 200 NIH thrombin-units per mg. of protein content.

EXAMPLE 2

20 g. of Bothrops atrox venom were dissolved in 1000 ml. of 0.9 percent NaCl solution and the pH of the resulting solution was adjusted to 6.5. After addition of 670 ml. of saturated ammonium sulphate solution the mixture was allowed to stand at 20°C. for 1 hour and then centrifuged. A further 552 ml. of saturated ammonium sulphate solution were added to the centrifugate. After 1 hour the resulting precipitate was separated by centrifugation and dissolved in 100 ml. of distilled water. The solution was adjusted to pH 3.5 by means of dilute acetic acid and then heated for 1 hour to 30°C. The precipitate formed was separated by centrifugation, the centrifugate was adjusted to pH 5.0 and, after addition of 3 ml. of m-cresol thereto, was allowed to stand at room temperature for 15 hours. The precipitate was separated by centrifugation, washed twice with 10 ml. portions of water saturated with cresol, dissolved in 50 ml. of distilled water with the addition of 1N NaOH at pH 8.0. After removal of undissolved portions by centrifugation the solution was filtered through an ultrafilter AMICON UM-10. The filter residue was washed with distilled water until no more cresol was detectable in the effluent filtrate by the iron$^{III}$-chloride reaction. The enzyme-containing filter residue was taken up in 20 ml. of TRIS-PO$_4$-buffer (pH of 6.0; 0.02 molar). After removal of undissolved portions by centrifugation the solution was poured at a rate of 0.8–1 ml./min. onto a column of 200 ml. of DEAE-Sephadex A-50 equilibrated with the same buffer and then washed with 800 ml. of TRIS-PO$_4$-buffer (pH of 6.0; 0.02 molar). The thrombin-like enzyme was then eluted with 400 ml. of TRIS-PO$_4$-buffer (0.04 molar; pH of 6.0). The active eluate was concentrated on an ultrafilter UM–10 under pressure and washed until it was free of salts.

The concentrate thus obtained was either directly processed to form a sterile solution for injection purposes or dried in vacuo. After drying there were obtained about 200 mg. of enzyme composition having an activity of about 120 to 160 NIH thrombin-units per mg. of protein content.

EXAMPLE 3

A column of 1.8 cm$^2$ cross-section and 92 cm. length was charged with "SEPHADEX$_f$G–100". The Sephadex gel was equilibrated with 10 percent aqueous acetic acid. 6.26 mg. of the enzyme composition obtained according to Example 1 (purity degree II) were dissolved in 0.3 ml. of 10 percent aqueous acetic acid. The solution was poured onto the column. 10 percent aqueous acetic acid was passed through the column from below at a flowing velocity of 5.6 ml. per hour. Two UV-absorbing zones (280 $\mu$) formed. The eluate resulting from the first zone was freeze-dried and yielded 4.25 mg. of enzyme composition having an activity of 200 to 250 NIH thrombinunits per mg. of protein content.

We claim:

1. An enzyme composition from venom of Bothrops atrox of any other snake the venom of which is immunologically cross-reactive with Bothrops atrox venom, the said enzyme composition having, at lower doses, a hemostatic activity and, at higher doses, a blood anticoagulant activity in humans and other mammals, and being characterized by the following properties:

a. it has a thrombin-like endopeptidase activity,
   b. it comprises a peptide component and a carbohydrate component, the peptide component including one or more polypeptides having a molecular weight between about 18,000 and 55,000 as determined by the equilibrium ultracentrifugation method,
   c. it has a carbohydrate (neutral sugar) content of about 2 to 10 percent by weight, based on the protein content,
   d. it is scarcely soluble in distilled water but readily soluble in physiological sodium chloride solution,
   e. it forms complexes with phenol and phenol derivatives, which complexes are scarcely soluble or insoluble in water,
   f. it causes coagulation of fibrinogen by selective elimination of fibrinopeptides A from fibrin without releasing fibrinopeptides B,
   g. it has a thrombin-like activity corresponding to about 30 to 450 NIH-thrombin units per mg. of protein content,
   h. it splits tosylarginine methyl ester and gelatin but not lysin methyl ester, phenylalanine ethyl ester, N-acetylmethionine, N-acetyltyrosine, leucylglycine and casein,
   i. it is not inhibited by heparin, heparinoids, hirudin, antithrombins and the polyvalent peptidase inhibitor of KUNITZ,
   k. it is inhibited at an enzyme concentration of about 5 mg. per ml. to the extent of about 95 percent with respect to its coagulation and esterase activity by 2.5 × 10$^{-3}$ molar diisopropyl fluorophosphate at a pH of 8 within 2 hours,
   l. it is competitively inhibited by tosylarginine methyl ester and completely inhibited by the antibody contained in antibothrops serum,
   m. it is not fixed and, therefore, not inactivated by fibrin, n. it has a substantially longer biological halflife time than heparin,
o. it causes the formation of a fibrin derivative which interacts with excess fibrinogen to form a nonpolymerizable fibrin-fibrinogen complex,
p. it acts on fibrinogen with formation of a fibrin which has physico-chemical properties different from those of fibrin produced by thrombin insofar as it is rapidly hydrolyzed by fibrinolytic enzymes even in the presence of activated factor XIII and of calcium ions and is soluble in 5-molar aqueous urea, and
q. it causes in vivo a defibrinogenation and a secondary fibrinolysis without hemorrhagic and thromboembolic side effects.

2. The enzyme composition according to claim 1 which, after having been subjected to hydrolysis at 110°C. for 22 to 72 hours with constant boiling hydrochloric acid, shows the following amino acid analysis:

| Amino acids | micromoles per mg. of peptide component |
|---|---|
| Aspartic acid | 1 – 1.3 |
| Threonine | 0.35 – 0.55 |
| Serine | 0.4 – 0.5 |
| Glutamic acid | 0.65 – 0.75 |
| Proline | 0.55 – 0.9 |
| Glycine | 0.65 – 0.9 |
| Alanine | 0.4 – 0.65 |
| Cystine ½ | 0.35 – 0.6 |
| Valine | 0.45 – 0.6 |
| Methionine | 0.1 – 0.2 |
| Isoleucine | 0.45 – 0.75 |
| Leucine | 0.45 – 0.65 |
| Tyrosine | 0.3 – 0.5 |
| Phenylalanine | 0.3 – 0.45 |
| Histidine | 0.2 – 0.25 |
| Lysine | 0.45 – 0.65 |
| Arginine | 0.3 – 0.45 |

3. The enzyme composition according to claim 1 which is free from neurotoxin, bradykinin-forming proteases, phospholipases, amino acid oxydases and phosphatases.

4. The enzyme composition according to claim 1 which, in highly purified form, has the following amino acid sequence starting from the N-terminal chain end: valine → isoleucine → glycine → glycine → aspartic acid → glutamic acid.

5. Process for the preparation of an enzyme composition which comprises
1. preparing an isotonic aqueous solution of snake venom of the genus of Bothrops having a pH of about 4.5 to 7,
2. either
   a. subjecting the said isotonic solution to a fractional salt precipitation in order to first eliminate ballast substances and then to precipitate a fraction containing the enzyme material, dissolving the said fraction in distilled water, adjusting the solution to a pH of about 3 to 4, heating the solution for a few minutes to about 2 hours at temperatures of about 30–50°C., separating precipitated proteins and adjusting the pH of the residual solution to about 4 to 6, or
   b. adjusting the said isotonic solution to a pH of 3 to 4 and heating the same for a few hours to about 2 hours at temperatures of about 30°–50°C., separating precipitated proteins, adjusting the residual solution to a pH of about 4.5 to 7, and subjecting the same to a fractional salt precipitation in order to first eliminate ballast substances and then precipitate a fraction containing the active enzyme material, dissolving the said fraction in distilled water and adjusting the solution to a pH of about 4 to 6, and
3. adding phenol or a phenol derivative to the solution obtained according to (a) or (b) in order to precipitate an insoluble complex containing the enzyme material, and either
   c. decomposing the complex by treatment with dilute acetic acid in a polar organic solvent and isolating the released, undissolved enzyme material, or
   d. treating the complex in an aqueous medium with a base at a pH of about 7.5 to 8.5 and isolating the released enzyme material by ultrafiltration, dialysis or gel filtration, and further purifying the thus obtained enzyme material.

6. The process according to claim 5 wherein the purification of the enzyme composition is carried out by chromatography on a basic ion exchanger.

7. The process according to claim 5 wherein the said fractional salt precipitations are carried out by means of ammonium, alkali metal or alkaline earth metal salts of mineral acids.

8. The process according to claims 5 wherein the fractional salt precipitations are carried out by means of ammonium sulphate at a pH of about 4.5 to 7, preferably at about 6.5.

9. The process according to claim 5 wherein phenol carboxylic acids, alkyl phenols, halogenated phenols, halogenated or alkylated phenol carboxylic acids or salts of phenol carboxylic acids or derivatives thereof are used as phenol derivatives for forming the insoluble complex.

10. The process according to claims 5 wherein phenol, cresol or sodium salicylate is used for forming the insoluble complex.

11. The process according to claim 5 wherein the purification of the enzyme composition is carried out by chromatography on gels such as polydextran, polyacrylamide, agarose or agar gels using mixtures of aliphatic carboxylic acids with water or mixtures of aqueous buffers with water-miscible organic solvents as flowing agent or eluant.

12. The process according to claim 1 wherein the fractional salt precipitations are carried out by means of ammonium sulphate at a pH of about 4.5 to 7, preferably at about 6.5.

13. The process according to claim 9 wherein phenol, cresol or sodium salicylate is used for forming the insoluble complex.

* * * * *

UNITED STATES PATENT OFFICE
CERTIFICATE OF CORRECTION

Patent No. 3,849,252     Dated November 19, 1974

Inventor(s) Edmund E. Percs et al.

It is certified that error appears in the above-identified patent and that said Letters Patent are hereby corrected as shown below:

Column 1, line 31 reads "no" should read --not--.

Column 2, line 10 reads "it" should read --(f) it--.

Column 8, line 36 reads "vanae or of the retina vanae" should read --venae or of the retina venae--.

Column 9, line 34 reads "as doses" should read --at doses--.

Column 10, line 59 reads "isoalted" should read --isolated--.

Column 12, line 22 reads "of any" should read --or any--.

Signed and sealed this 18th day of February 1975.

(SEAL)
Attest:

RUTH C. MASON
Attesting Officer

C. MARSHALL DANN
Commissioner of Patents
and Trademarks